May 13, 1924.
P. E. WELTON
PNEUMATIC PRESSURE GAUGE
Filed Jan. 17, 1923
1,493,715
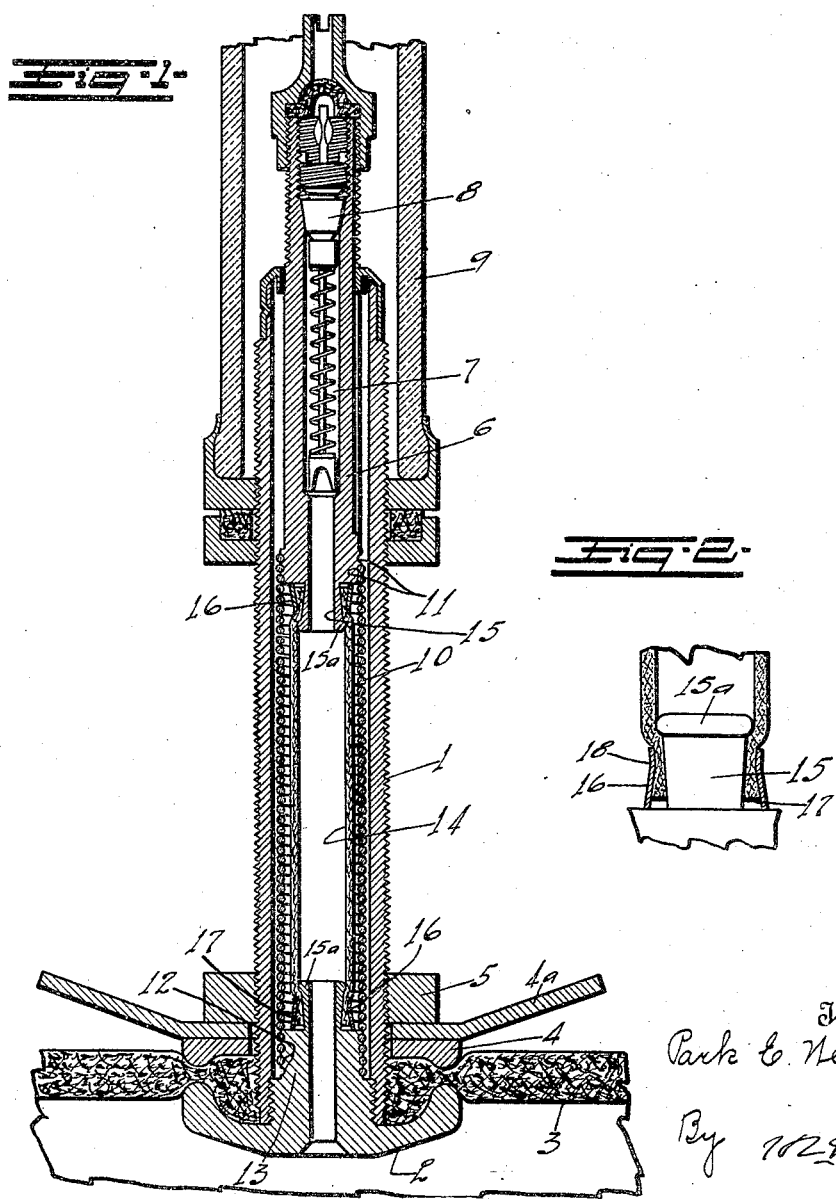
Inventor
Park E. Welton
By
Attorney Patented May 13, 1924.

1,493,715

UNITED STATES PATENT OFFICE.

PARK E. WELTON, OF CUYAHOGA FALLS, OHIO, ASSIGNOR TO TIREGAGE VALVE CORPORATION, OF CHARLESTON, WEST VIRGINIA, A CORPORATION OF WEST VIRGINIA.

PNEUMATIC PRESSURE GAUGE.

Application filed January 17, 1923. Serial No. 613,252.

*To all whom it may concern:*

Be it known that I, PARK E. WELTON, a citizen of the United States, residing at Cuyahoga Falls, in the county of Summit and State of Ohio, have invented new and useful Improvements in Pneumatic Tire Gauges, of which the following is a specification.

This invention is designed to improve pneumatic tire pressure gauges. As some of these have been formed they are provided with a sliding plunger in the tire stem which registers and indicates the tire pressure. The inflation is accomplished through the plunger and the plunger, therefore, must be connected with the inner end of the stem so as to communicate with the tire both to receive and respond to its pressure and to provide for inflation. These devices must be, to be successful, absolutely tight and it has been common to connect the plunger with the inner end of the stem through a rubber tube. Great difficulty has been experienced in so securing the ends of the rubber tube as to prevent the cracking or breaking of the tube at this point. This difficulty is particularly true in that there is a slight movement of the plunger due to shocks on the tire and consequent pressure as the device is being used. The present invention is directed to improving the method of securing the tube so as to prevent the breaking of the tube at this point.

The invention is illustrated in the accompanying drawings as follows:—

Fig. 1 shows a central section of the tire gauge.

Fig. 2 an enlarged view of one of the ends of the tube showing the manner of securing the same.

1 marks the tire stem, 2 the head on the stem, 3 the inner tire tube, 4 a clamping plate, 4ª a spreader, and 5 a clamping nut arranged on the stem. These parts operate in the usual manner.

A plunger 6 is slidingly mounted in the stem. It has an opening 7 through it in which is arranged an inflation valve 8. A transparent cap 9 is provided on the stem through which the position of the plunger may be observed, the pressure being thus indicated. A spring 10 is secured to threads 11 on the plunger and to threads 12 on a projection 13 of the head 2. It resists the movement of the plunger and is calibrated so that the movement of the plunger will indicate the tire pressure.

A rubber tube 14 connects the plunger with the head 2, the head having a perforation to continue the connection. Nipples 15 are provided on the end of the plunger and the projection 13. This nipple has a slight bead 15ª at its inner end and is preferably tapered with the small end of the taper away from the end of the nipple. The rubber tube is carried over this nipple and bound thereon by a ferrule 16, the space between the ferrule and the nipple being less at the end of the ferrule away from the end of the rubber tube, thus crowding the rubber back from the point of strain at the end of the ferrule and forming an enlarged portion or end of rubber at 17. The ferrule is preferably eased off and bent outwardly from a point 18 so that the rubber is relieved at the point of leaving the clamping means. With this structure the rubber back of the most retracted portion sustains its part of the strain and consequently the rubber as a whole sustains the stretching action due to the movement of the plunger without undue tendency to crack or break at the point at which it is secured to the nipples.

What I claim as new is:—

1. In a pneumatic tire gauge, the combination with a stem of a plunger slidingly mounted in the stem; a rubber tube forming a connection between the plunger and the end of the stem; and means for securing the end of the tube comprising a nipple and a ferrule compressing the rubber on the nipple, the ferrule and nipple being spaced farther apart at points nearer the end of the rubber tube than at points more remote from the rubber tube.

2. In a pneumatic tire gauge, the combination with a stem of a plunger slidingly mounted in the stem; a rubber tube forming a connection between the plunger and the end of the stem; and means for securing the end of the tube comprising a nipple and a ferrule compressing the rubber on the nipple, the ferrule and nipple being spaced farther apart at points nearer the end of the rubber tube than at points more remote from the rubber tube, the end of the ferrule at the leaving point of the rubber being bent outwardly.

3. In a pneumatic tire gauge, the combination with a stem of a plunger slidingly mounted in the stem; a rubber tube forming a connection between the plunger and the end of the stem; and means for securing the end of the tube comprising a nipple with a bead at its end and a ferrule compressing the rubber on the nipple, the ferrule and nipple being spaced farther apart at points nearer the end of the rubber tube than at points more remote from the rubber tube.

4. In a pneumatic tire gauge, the combination with a stem of a plunger slidingly mounted in the stem; a rubber tube forming a connection between the plunger and the end of the stem; and means for securing the end of the tube comprising a nipple tapered with the small end away from the end of the nipple and a ferrule compressing the rubber on the nipple.

5. In a pneumatic tire gauge, the combination with a stem of a plunger slidingly mounted in the stem; a rubber tube forming a connection between the plunger and the end of the stem; and means for securing the end of the tube comprising a nipple and a ferrule compressing the rubber on the nipple, the ferrule being tapered with the small end toward the end of the nipple.

6. In a pneumatic tire gauge, the combination with a stem of a plunger slidingly mounted in the stem; a rubber tube forming a connection between the plunger and the end of the stem; and means for securing the end of the tube comprising a nipple tapered with the small end away from the end of the nipple and a ferrule compressing the rubber on the nipple, the ferrule being tapered with the small end toward the end of the nipple.

In testimony whereof I have hereunto set my hand.

PARK E. WELTON.